United States Patent [19]
Miller et al.

[11] Patent Number: 6,043,336
[45] Date of Patent: Mar. 28, 2000

[54] ELECTRICALLY CONDUCTING DENDRIMERS

[75] Inventors: Larry L. Miller, Minneapolis, Minn.;
Donald A. Tomalia, Midland, Mich.;
Robert G. Duan, Maplewood, Minn.

[73] Assignee: Dendritech, Inc., Midland, Mich.

[21] Appl. No.: 09/000,311

[22] PCT Filed: Jul. 25, 1996

[86] PCT No.: PCT/US96/12283

§ 371 Date: Jan. 26, 1998

§ 102(e) Date: Jan. 26, 1998

[87] PCT Pub. No.: WO97/05631

PCT Pub. Date: Feb. 13, 1997

[51] Int. Cl.⁷ .......................... C08G 63/00; C08G 73/00
[52] U.S. Cl. .......................... 528/310; 528/322; 528/328; 528/331; 528/332; 528/363; 528/422; 424/DIG. 16; 525/418; 525/451
[58] Field of Search ..................... 528/310, 363, 528/328, 331, 332, 422, 322

[56] References Cited

U.S. PATENT DOCUMENTS

| | | | |
|---|---|---|---|
| 4,558,120 | 12/1985 | Tomalia et al. | 528/363 |
| 5,272,217 | 12/1993 | Miller et al. | 525/326.7 |
| 5,520,904 | 5/1996 | Nosco et al. | 423/263 |
| 5,527,524 | 6/1996 | Tomalia et al. | 424/486 |
| 5,530,092 | 6/1996 | Meijer et al. | 528/363 |

FOREIGN PATENT DOCUMENTS 0682059  12/1995  European Pat. Off. .

*Primary Examiner*—P. Hampton-Hightower
*Attorney, Agent, or Firm*—Price, Heneveld, Cooper, DeWitt and Litton

[57] ABSTRACT

An electrically conductive polymer is comprised of the reaction product of a dendrimer and an electrophoric compound which exhibits π-stacking upon reduction. The reaction product which is a peripherally modified dendrimer is formed and reduced, either chemically or electrochemically, in a polar solvent. The reduced electrophoric moieties aggregate (form π-stacks) to form electrically conductive pathways. The reduced peripherally modified dendrimers of the invention can be cast into films and other solid forms to provide flexible electrical conductors and semiconductors. The conductive polymers of the invention exhibit electrical conductivities comparable to that of doped polyacetalene, but are oxygen and moisture stable.

38 Claims, No Drawings

ELECTRICALLY CONDUCTING DENDRIMERS

This invention was made with government support under No. CHE-9216003 awarded by the National Science Foundation. The government has certain rights in the invention.

BACKGROUND OF THE INVENTION

This invention relates generally to novel polymers exhibiting electrical conductivity and electrically conductive films formed therefrom, and more particularly to peripherally modified polymers which exhibit isotropic electrical conductivity.

Because of their elasticity and plasticity, electrically conducting polymers have certain significant advantages over metallic and other non-polymeric electrical conductors and semiconductors. However, some of the more commonly employed polymeric conductors such as polypyrrole, polythiophenes, polyanilines, polyacetylenes and polyarylenes have certain disadvantages such as lower than desired electrical conductivity, air-sensitivity, moisture-sensitivity, and do not always exhibit the desired elasticity and plasticity properties. For example, the most popular electrically conductive polymer, polyacetylene, does not exhibit good electrical conductivity unless it is doped, i.e., reacted with electron acceptors or donors and the resulting highly electrically conductive polyacetylene derivatives are in general highly sensitive to the environment and rapidly loose their initial electrical conductivity in the presence of air and/or moisture. Additionally, polyacetylene is insoluble and infusible and therefore cannot be easily formed into desired shapes.

In order to overcome some of the undesirable properties of polyacetylenes, such as air-sensitivity, moisture-sensitivity, insolubility, and infusibility, various substituted polyacetylenes in which one or both of the hydrogen atoms is replaced by another element or group have been synthesized. While certain substituted polyacetylenes have exhibited high oxygen stability and the ability to be cast as films from solution, they have in general proved to be disappointing with respect to their electrical properties, with typical conductivities being in the range of $10^{-16}$ to $10^{-18}$ S cm$^{-1}$. Doping of the substituted polyacetylenes such as with iodine improves the conductivity up to the range of from about $10^{-6}$ to about $10^{-3}$ S cm$^{-1}$, but these values are much inferior to those of doped polyacetylene. Other conducting polymers generally have electrical conductivities which are considerably lower than that of doped polyacetylene and/or have other important disadvantages. Accordingly, there remains a need for electrically conductive polymers which have electrical conductivities comparable to that of doped polyacetylene, and which are castable and environmental stable.

Recently, attention has been directed toward the construction of macromolecular complexes from cationic polymers and monomeric anion radicals to produce conductive polymers having π-stacks of organic ion radicals or charge transfer complexes. For example U.S. Pat. No. 5,272,217 discloses a polymeric complex comprised of a quaternized cationic polyamine which is combined with N,N-bis(4,-hydroxysulfonylphen-1'-yl)-1,4,5,8-naphthalenetetracarboxylic acid diimide disodium salt. The complex is precipitated as a solid or deposited as a film by electro-precipitation. The resulting complex exhibits highly anisotropic electrical conductivity which is generally several orders of magnitude lower than that of doped polyacetylene.

SUMMARY OF THE INVENTION

The invention provides a novel polymer exhibiting isotropic electrical conductivity which is comparable to that of doped polyacetylene and which exhibits excellent oxygen and moisture stability. Additionally, the electrically conductive polymers of the invention are soluble in various organic solvents and can be readily cast into films or other solid forms. The invention thereby provides a polymer having an electrical conductivity which is comparable to that of the most highly conductive polymers previously known and which overcomes many of the problems of non-conductive polymers.

The invention broadly comprises dendrimers which have been peripherally modified with imide electrophores and subsequently reduced, either chemically or electrochemically, to form soluble polymers which can be cast into flexible films or other forms to produce organic solids exhibiting unusually high electrical conductivity of an isotropic nature.

The invention also provides a method for preparing isotropic, highly electrically conductive dendrimers in solution, and to solid conductive dendrimers cast from such solutions.

DESCRIPTION OF THE PREFERRED EMBODIMENTS

The dendrimers which can be used in the preparation of the conductive polymers of the invention include generally any of the known dendrimers having a polyvalent core which is covalently bonded to at least two ordered dendritic branches which extend through at least two generations. Dendrimers comprise a core, plural generations or layers of branches, wherein each generation extends from the core or from a prior generation of branches, and wherein each branch in each generation has the same number of reactive sites (at least 2), from which the branches in the next succeeding generation (if any) extend, or which serve as terminal reactive sites in the last generation of branches. In so called dense star polymers, the reactive sites are symmetrically located at the end of each branch. In unsymmetrically branched dendrimers, the reactive sites are unsymmetrically located on a given branch, e.g., one might be located along the length of the branch while another might be located at the end of the branch. The term dendrimers as used herein is intended to include dendrons. A dendron is a species of dendrimer having branches emanating from a focal point which is or can be joined to a core, either directly or through a linking moiety. An ammonia core dendrimer might be thought of as an ammonia molecule having 3 dendrons radiating from the core.

Since dendrimers are formed by a series of reiterative or generational reactions, they are typically identified by the number of generations to which they have been reacted, e.g. G5, G10, etc. Under current nomenclature, a dendrimer core with a first set of branches attached thereto is referred to as a "zero generation" or G0 dendrimer. Once the second set of branches it attached to the first set of branches, it is a first generation or G1 Starburst® dendrimer. Dendrimers are identified herein in accordance with this generational nomenclature scheme.

Much of the prior patent literature involving dendrimers uses a variation on this nomenclature in which a core with a first set of branches emanating therefrom is referred to as a first generation or G1 dendrimer, instead of a zero generation or G0 dendrimer. Thus, the same dendrimer will have a different "G" number, depending upon whether the prior nomenclature literature is followed, or whether the current nomenclature is utilized. The current nomenclature, in which the core and first set of branches are referred to a "G0" dendrimer, is used herein.

Suitable dendrimers are generically described and specifically disclosed in U.S. Pat. No. 4,558,120. Examples of suitable dendrimers include those having any of the variety of functionally active terminal moieties such as carboxyl, aziridinyl, oxazolinyl, haloalkyl, oxiranyl, hydroxy, isocyanato, amine and carboxylic ester moieties. For example, amidoamine dendrimers, polysulfide dendrimers, polyaminosulfide dendrimers, polyether dendrimers, and the like may be utilized in the practice of the present invention, with polyamidoamine dendrimers (PAMAM dendrimers) being most preferred. Dendrimers having generally any number of dendritic branches and any number of generations can be utilized in the practice of the invention, with generations 2 through 12 being preferred.

The dendrimers can be prepared by any known method such as by the excess reactant method. For example, amidoamine dendrimers can be prepared by reacting a nucleophilic core compound such as ammonia with methyl acrylate under conditions sufficient to cause the Michael addition of one molecule of the ammonia to three molecules of the methyl acrylate to form an adduct of the formula N(CH$_2$CH$_2$CO$_2$CH)$_3$. Following removal of unreacted methyl acrylate, the above adduct is then reacted with excess ethylenediamine under conditions such that one amine group of the ethylenediamine molecule reacts with the methyl carboxylate group of the core adduct to form a zero generation adduct having three amidoamine moieties. The ratio of excess ethylenediamine to methyl carboxylate moieties is preferably from about 2:1 to about 120:1. Following removal of unreacted ethylenediamine, the zero generation adduct is then reacted with excess methyl acrylate under Michael's addition conditions to form a second generation adduct having terminal methyl ester moieties, which are subsequently reacted with excess ethylenediamine under amide forming conditions to produce a polyamidoamine dendrimer having ordered, first generation dendritic branches with terminal amine moieties. The excess of co-reactant to reactive moieties is preferably from about 2:1 to about 120:1. Second and higher ordered dendrimers can be formed by alternatively reacting the terminal amine moieties with excess methyl acrylate to form terminal methyl carboxylate groups, removing excess methyl acrylate and reacting the terminal carboxylate groups with excess ethylenediamine. Other amidoamine dendrimers can be made using different organic amines as the core compound. For example, ethylenediamine can be used to produce a tetra-branched dendrimer or diethylenetriamine can be used to produce a penta-branched amidoamine dendrimer. Other dendrimers and methods for producing the same are disclosed in U.S. Pat. No. 4,558,120.

Suitable electrophores for use with the invention include naphthalene diimide compounds which are formed during the reaction of an imide anhydride with an amino terminated dendrimer, such as by the following reaction:

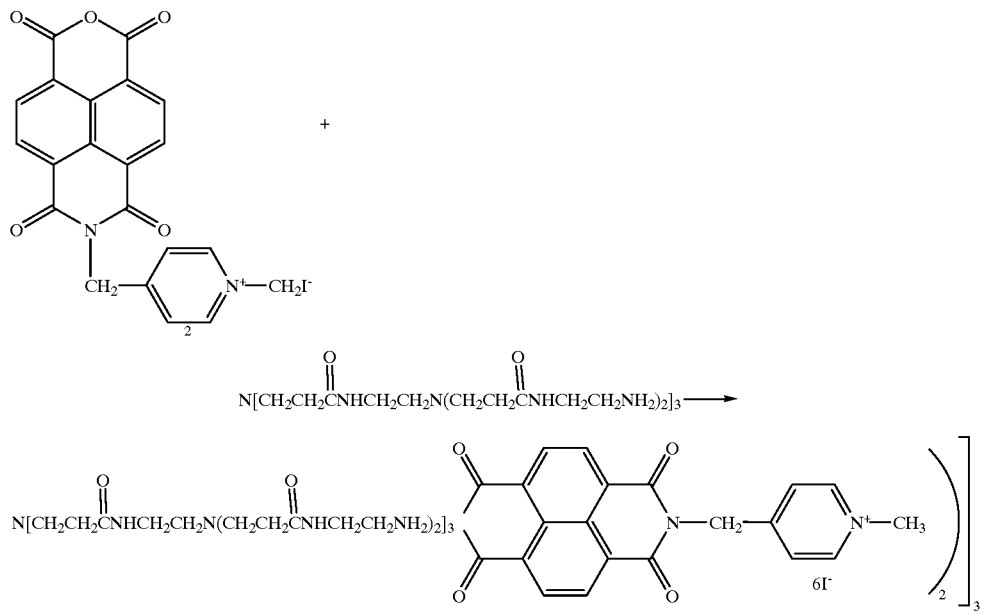

In the case of polyamidoamine dendrimers having primary amine terminal groups, suitable mono-anhydride mono-imide compounds include those having the general formula:

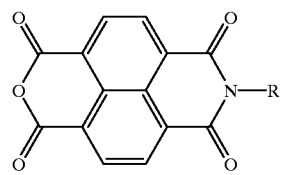

wherein R is as follows:

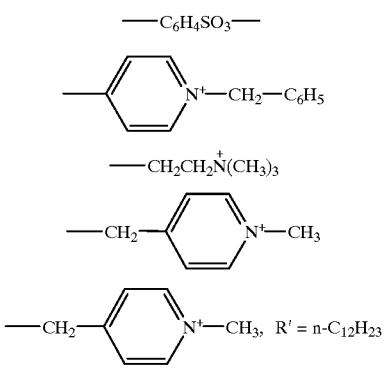

wherein R' is an alkyl such as n-$C_{12}H_{23}$.

A preferred mono-anhydride mono-imide compound for use with the invention is given by the following formula:

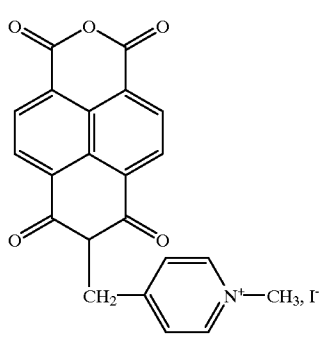

I

The dendrimer and the chosen electropliore are chemically reacted to covalently bond the electrophore to the terminal functional groups on the dendrimer. The resulting peripherally modified dendrimer has electrophoric moieties which can be reduced in a polar solvent to form anion radical groups which aggregate into π-stacks which can form electrically conductive pathways. For example, a polyamidoamine dendrimer can be reacted with a naphthalene diimide having the above formula I to form a dendrimer having the following structure:

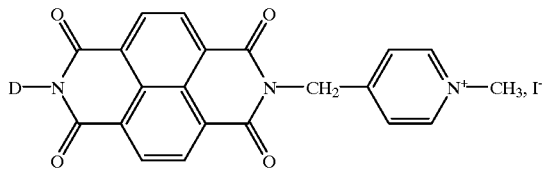

II wherein D represents a PAMAM dendrimer and n represents the number of mono-imide compounds reacted with terminal functional moieties of the dendrimer. The modified dendrimer can be reduced in aqueous or polar solution to form conductive π-stacks. The selected dendrimers and selected electrophores can be reacted in various polar solvents such as dimethylformamide, dimethylacetamide, formamide and the like. The amount of imide anhydride which is reacted with tile selected dendrimer can vary greatly depending on the desired properties. Typically the electrophores are utilized in amounts and reacted for a sufficient period of time and at a sufficient temperature to achieve sufficient peripheral modification of the dendrimer so that it will exhibit electrical conductivity when reduced in a polar solution. For example, complete reaction between 70% of the functionally active terminal amine groups of an amidoamine dendrimer and an equivalent amount of naphthalene mono-imide, mono-anhydride can be achieved at about 120° C. in dry DMF in approximately 14 hours. Desirably at least 50%, and more desirably at least 70% of the functionally active terminal groups are reacted with an electrophore. Higher and lower levels of peripheral modification of the dendrimer polymer with various electrophores can be achieved by appropriately varying the relative proportion of the electrophores to the reactive terminal groups, the temperature, reaction time, solvent, and other parameters in a manner generally known or at least readily determinable by those having ordinary skill in the art. There is, in general, no upper or lower limit to the percentage of reactive terminals on the dendrimer which can be modified by reaction with suitable electrophores in accordance with the invention. However, it is believed that the loading or extent of reaction of the reactive terminals of the dendrimers with the electrophores is directly related to the electrical conductivity of the resulting chemically or electrochemically reduced peripherally modified dendrimers after they have been suitably cast into films or other solid forms. That is to say higher loadings are believed to generally provide for higher electrical conductivities in the resulting films or other solid forms. In this manner, it is believed that conductive dendrimers having various conductive and semiconductive properties can be prepared as desired. Suitable conversion levels for achieving excellent conductive properties can be achieved by reacting from about 50 to 100% of the available terminal reactive sites of the dendrimer with a suitable electrophore.

After the dendrimers have been suitably modified by reaction with an electrophore, such as the disclosed naphthalene diimide compounds, the resulting peripherally modified dendrimers are contacted with a reducing agent to convert the terminally bonded electrophore into anion radical groups which form π-stacks in polar solutions. Generally, any of a variety of known reducing agents can be utilized to reduce the terminal electrophoric moieties to form anion moieties. The selection of suitable and appropriate reducing agents is well within the ability of those having ordinary skill in the art. A preferred reducing agent is $Na_2S_2O_4$ which can be utilized in varying amounts depending upon electric conductivity and other properties which are desired. Reduction of the electrophoric moieties can be achieved by adding the reducing agent directly to a solution containing peripherally modified dendrimer in a polar solvent such as formamide. The solution must be deoxygenated with argon before the addition of the reducing agent. The reduction occurs relatively rapidly at room temperature and does not require any special conditions, although mild agitation and heating of the solution is desirable.

Films or other solid forms can be obtained by conventional casting techniques wherein the solvent is evaporated from the solution. The solvent is preferably evaporated under a flowing inert atmosphere such as argon. It has been determined that film quality is dependent upon the solvent from which the films are cast. For example, it has been determined that films cast from a very polar organic solvent such as formamide are smoother and more homogeneous than films cast from water. The films and other solid forms can be cast at a variety of suitable temperatures. However it has been discovered that films cast at lower temperatures (below 100° C.) such as 60° C. have higher electrical conductivities than film cast at higher temperatures (above 100° C.) such as 120° C. It has also been discovered that films prepared from modified dendrimers which are partially reduced have higher electrical conductivities than films produced from modified dendrimers which are substantially completely reduced.

Depending upon the particular dendrimers and electrophores, solvents, reaction conditions, reducing agents utilized, and the conditions under which the films are cast, the electrically conductive films of the invention have exhibited electrical conductivities within the range from <$10^{-4}$ S cm$^{-1}$ to about $1 \times 10^{-2}$ S cm$^{-1}$. The films have not exhibited any significant sensitivity to exposure to the atmosphere (i.e., are not sensitive to oxygen). The conductive films of the invention however exhibit reversible humidity dependant electrical conductivity. Specifically, it has been discovered that the electrical conductivity changes very quickly and reversibly in response to changes in humidity. For example, it was observed that high humidity increased fully reduced film conductivities to 0.21 S cm$^{-1}$ and increased partially reduced film conductivities to values as high as 11 S cm$^{-1}$. Accordingly, in addition to having utility as polymeric, electrical conductors or semiconductors, the conductive films of the invention can be utilized as a detecting element in a humidity gauge.

The invention will be described in further detail with respect to the following examples.

EXAMPLE 1

A generation 3 PAMAM dendrimer (G3), with an NH$_3$ core (150 mg, 29 μmol, 0.7 mmol of amine groups), in a methanol solution (611 mg total weight) was added to a vessel containing 65 ml of DMF. The solution was bubbled with nitrogen at 120° C. to distill out methanol. After 1 hr a condenser was attached and to the vessel was added a monoimide-monoanhydride (524 mg, 1.0 mmol) having the following formula:

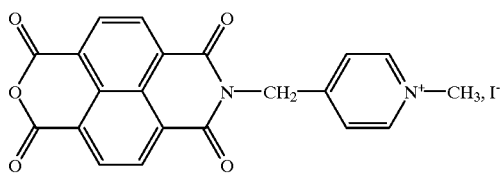

Reaction was carried out at 120° for 40 hr under nitrogen. After cooling, ether was added to precipitate the product, which was filtered and washed with ether, yielding 515 mg of G3. UV-vis (DMF) λmax 360, 380 nm. IR (KBr) 3500, 1704, 1665, 1640 (br), 1581, 1452, 1343 cm$^{-1}$. $^1$H nmr (300 Mhz, DMSO-d$_6$) δ 8 8.89 (d, J=6.6, 2H, pyH), 8.53 (br, 5.2H, naphH and CONH), 8.18 (d, J=6.6 Hz, 2H, pyh), 8.1–7.9 (mult, 1.4H, CONH peaks), 5.47 (s, 2H, NCH$_2$py), 4.27 (s, 3H, CH$_3$py), 4.15 (br s, 2H, NCH$_2$dend), 3.2–2.55 (5.1H, dend), 2.40–1.80 (6.3H, dend). The NH protons were exchangeable with D$_2$O).

The resulting peripherally modified dendrimers had the following general formula,

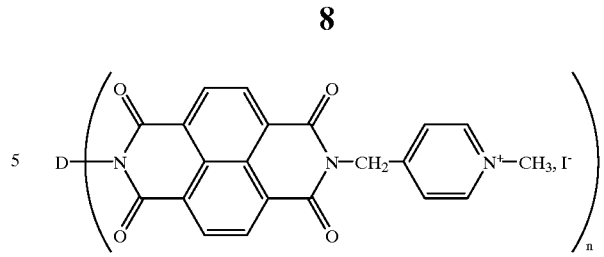

where n represent the number of monoimide-monoanhydride units reacted with terminal functional moieties of the G3 PAMAM dendrimer.

Loading (the number of imide groups compared to the theoretical number, 24 for G3) was estimated as 70% by vis spectroscopy in DMF and 81% coulometrically in DMF/0.1 M LiClO$_4$. Equations 1–4 were used for the calculation. Note that small errors in determination of the amount of imide lead to large differences in the calculated loading. Coulometric loading, $L_Q$, was computed using eqn 3, derived from eqns 1 and 2, where L is loading percent, n is the number of diimides per molecule, $^n$Th is the number of diimides on a fully loaded dendrimer, F is Faradays constant, MW$^D$ is molecular weight of the unmodified dedrimer, MW$^I$ is the molecular weight of modifier diimide plus iodide (482.2 g mol$^{-1}$), m is the mass analyzed and Q is the number of coulombs passed. Spectroscopic loading ($L_{vis}$) was calculated from the vis spectrum using eqn 4 where A is the absorbance at 380 nm, V is the volume of the solution, ε is the molar absorptivity of the model compound 3 (18,700) and 1 is the path length of the cell.

Loading equations $$L = \frac{n \times 100}{n_{th}} \qquad \text{eqn. 1}$$

$$n = \frac{Q(MW_D)}{Fm - Q(MW_1)} \qquad \text{eqn. 2}$$

$$L_Q = \frac{Q(MW_D) \times 100}{n_{th}Fm - n_{th}Q(MW_1)} \qquad \text{eqn. 3}$$

$$L_{vis} = \frac{AV(MW_D) \times 100}{n_{th}\varepsilon lm - n_{th}AV(MW_1)} \qquad \text{eqn. 4}$$

EXAMPLE 2

Films were cast from formamide (Aldrich 99.9%) solution (10% by weight) onto glass slides or a silicon wafer. Kept in a bell jar with a slow stream of argon flowing through it, the formamide was evaporated over a period of about 6 hr at 60° C. or 2 hr at 120° C. The dark brown films were studied on the substrate. Vis-NIR and IR spectra were recorded as previously described.[2] The film properties were stable for about two weeks in the laboratory atmosphere, but over a longer period of time carbonyl IR bands due to the neutral diimide grew in.

Four point conductivity measurements were made at 23° C. in the film plane under nitrogen in a controlled humidity atmosphere. Films cast at 60° C. had an electrical conductivity of about $2 \times 10^{-3}$ S cm$^{-1}$, whereas films cast at 120° C. had an electrical conductivity of about $2 \times 10^{-4}$ S cm$^{-1}$. The improved electrical conductivity is believed to be attributable to improved π-stacking at lower temperatures. Casting at lower temperatures did not appear to have any significant detrimental effect on polymer solubility or film homogeneity. For films reduced with 0.55 electrons per imide, and cast at 60° C., the conductivities were even higher, (about 6×10$^{-2}$ S cm$^{-1}$). This strongly suggests mixed valence stacks. All of the conductivities are ohmic, there being no evidence of polarization on switching the current direction, and the conductivity values remain constant for several hours, indicating that the conductivity is electronic, not ionic. When 2-probe measurements, corrected for contact resistance, were employed for cross-plane conductivity measurements, the films exhibited isotropic conductivity.

Visible (VIS) and near infrared (NIR) spectra of cast films were interpreted by comparison with solution spectra of monomeric diimide anion radicals that aggregate in water. It has been shown that π-dimers of these anion radicals absorb at about 1140 nm, and conducting π-stacks at longer wavelengths in the NIR or even IR. Films cast at 120° C. had only a small absorbance near 2200 nm. Films cast at 60° C. had a more intense π-stack peak, suggesting that π-aggregation is enhanced. Using only 0.55 equivalent of reducing agent diminished the π-dimer peak and increased the π-stack absorption. The maximum absorbance was in the IR region near 3000 nm. This shift in the optical conduction band is consistent with formation of mixed valence stacks containing both neutral diimide and anion radical diimide moieties. The IR spectrum also showed imide carbonyl bands at 1640 and 1527 cm$^{-1}$ which are typical for these aggregated anion radicals. Visible spectra of the films showed a maximum absorbance near 450 nm as expected.

The conductivities for the electrically conductive films of the invention are actually higher than the conductivities reported for pure diimide anion radical salts or those with ion radicals imbedded in polymers, and is only slightly lower than the conductivities of many conjugated chain polymers, like polypyrrole.

The embodiments of the invention in which an exclusive property or privilege is claimed are defined as follows:

1. A polymeric composition comprising the reaction product of a dendrimer and a compound which exhibits π-stacking upon reduction.

2. The composition of claim 1, wherein said compound is a mono-anhydride mono-imide compound.

3. The composition of claim 1, wherein said dendrimer is a poly(amidoamine).

4. The composition of claim 1, wherein said reaction product includes terminal moieties, and wherein the terminal moieties are reduced to form anion radical groups which aggregate to form electrically conductive pathways.

5. The composition of claim 1, wherein said dendrimer and said electrophoric compound are reacted in a polar solvent.

6. A polymeric composition comprising the reaction product of a dendrimer and a compound represented by the formula:

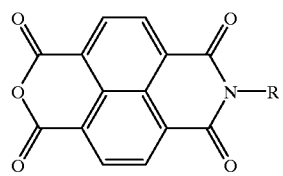

wherein R is as follows:

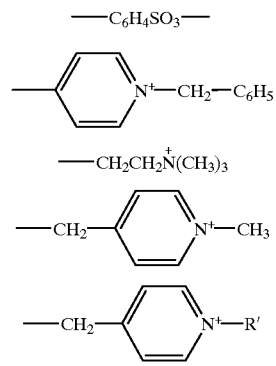

wherein R' is an alkyl
and said reaction product is a peripherally modified dendrimer represented by the formula

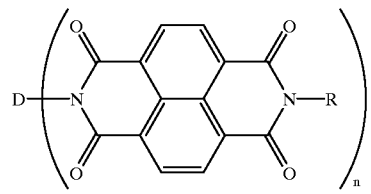

wherein D represents a dendrimer and n represents the number of molecules of said compound bonded to the dendrimer.

7. The composition of claim 6, wherein at least a portion of said molecules of said compound bonded to the dendrimer are reduced to form anionic radical groups which aggregate to form electrically conductive pathways.

8. The composition of claim 7, wherein said dendrimer and said compound are reacted in a polar solvent.

9. The composition of claim 8, wherein said dendrimer is a poly(amidoamine).

10. The composition of claim 6, wherein at least a portion of said molecules of said compound are reduced in polar solvent utilizing a chemical reducing agent.

11. An electrically conductive polymer comprising the chemically or electrochemically reduced product of a dendrimer and a compound which exhibits π-stacking upon reduction.

12. The electrically conductive polymer of claim 11, wherein said compound is a mono-anhydride mono-imide compound.

13. The electrically conductive polymer of 12, wherein said dendrimer is a poly(amidoamine).

14. An electrically conductive polymer comprising the chemically or electrochemically reduced product of a dendrimer and a compound represented by the formula

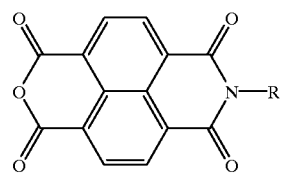

wherein R is as follows:

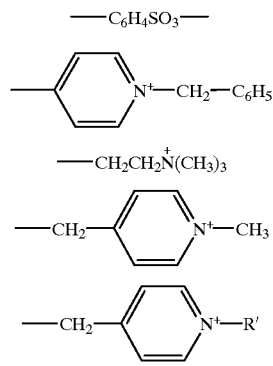

wherein R' is an alkyl and said reaction product is a peripherally modified dendrimer represented by the formula

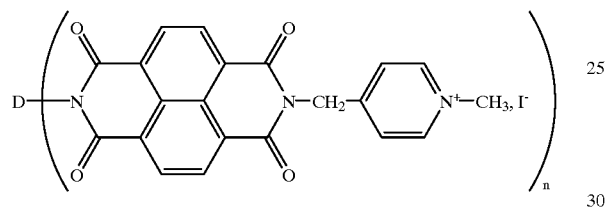

wherein D represents a dendrimer and n represents the number of molecules of said compound bonded to said dendrimer.

15. The electrically conductive polymer of claim 14, wherein said dendrimer and said compound are reacted in a polar solvent.

16. The electrically conductive polymer of claim 15, wherein said dendrimer is a poly(amidoamine).

17. An electrically conductive polymer comprising the chemically or electrochemically reduced product of a dendrimer having reactive terminal groups and a compound which exhibits π-stacking upon reduction.

18. The electrically conductive solid polymer of claim 17, wherein said product is formed and at least partially reduced in a polar solvent, and said solid polymer is formed by evaporation of a polar solvent containing said reduced product.

19. The electrically conductive solid polymer of claim 18, wherein said compound is a mono-anhydride mono-imide compound and said dendrimer is a poly(amidoamine).

20. An electrically conductive solid polymer comprising the chemically or electrochemically reduced product of a dendrimer having reactive terminal groups and a compound represented by the formula:

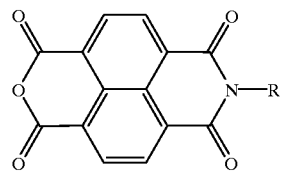

wherein R is as follows:

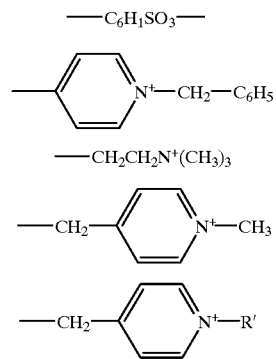

wherein R' is an alkyl and said reaction product having reducible terminal moieties and being represented by the formula:

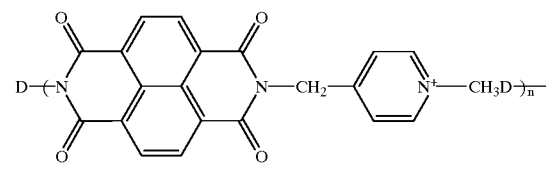

wherein D represents a dendrimer and n represents the number of molecules of said compound bonded to said dendrimer.

21. The electrically conductive solid polymer of claim 17, wherein at least 50% of the reactive terminal groups on the dendrimer are reacted with said compound.

22. The electrically conductive solid polymer of claim 17, wherein at least 70% of the reactive terminal groups of the dendrimer are reacted with said compound.

23. The electrically conductive solid polymer of claim 21, wherein less than all reducible terminal moieties are reduced.

24. The electrically conductive solid polymer of claim 23, wherein about 50% of the terminal moieties are reduced.

25. The electrically conductive solid polymer of claim 24, which is formed by solvent casting a temperature below about 100° C.

26. The electrically conductive solid polymer of claim 24, which is formed by solvent casting a temperature below about 60° C.

27. An electrically conductive material comprising a polymeric film which is the reaction product of a dendrimer and a compound which exhibits π-stacking upon reduction.

28. The material of claim 27, wherein the electrical conductivity of the film increases with increasing humidity.

29. The material of claim 27, wherein the film exhibits reversible humidity dependant electrical conductivity.

30. The material of claim 27, wherein said compound is a mono-anhydride mono-imide compound.

31. The material of claim 30, wherein said dendrimer is a poly(amidoamine).

32. An electrically conductive material comprising a polymeric film which is the reaction product of a dendrimer and a compound represented by the formula:

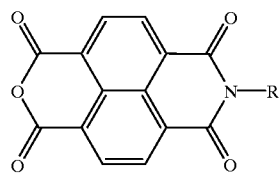

wherein R is as follows:

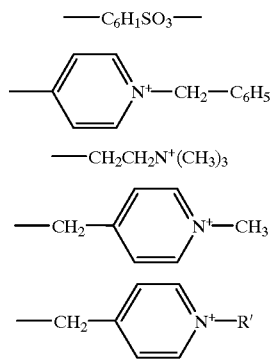

wherein R' is an alkyl
and said reaction product is a peripherally modified dendrimer represented by the formula

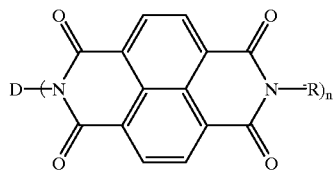

wherein D represents a dendrimer and n represents the number of molecules of said compound bonded to said dendrimer.

33. A method of forming an electrically conductive solid material, comprising:
reacting a dendrimer with a compound which exhibits π-stacking upon reduction to form a reaction product having reducible terminal moieties;
reducing at least a portion of said reducible terminal moieties of the reaction product to form anion radical groups; and
solvent casting the reaction product to form an electrically conductive solid.

34. The method of claim 33, wherein the step of reacting the dendrimer with a compound which exhibits π-stacking upon reduction is conducted in a solvent.

35. The method of claim 34, wherein the solvent is a polar solvent.

36. The method of claim 33, wherein said compound is a mono-anhydride mono-imide compound.

37. The method of claim 36, wherein said dendrimer is a poly(amidoamine).

38. A method of forming an electrically conductive solid material, comprising:
reacting a dendrimer with a compound represented by the formula:

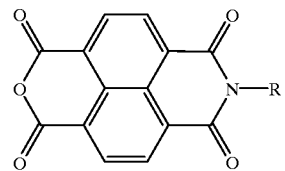

wherein R is as follows:

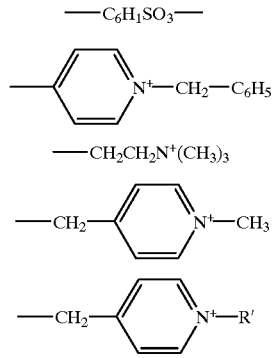

wherein R' is an alkyl
and said reaction product is a peripherally modified dendrimer represented by the formula

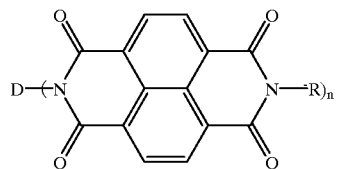

wherein D represents a dendrimer and n represents the number of molecules of said compound bonded to said dendrimer.

* * * * *